United States Patent
Lim et al.

(10) Patent No.: US 9,484,059 B2
(45) Date of Patent: Nov. 1, 2016

(54) STATIONARY AND ROTATABLE COMPONENTS OPERATIONAL WITH FIRST AND SECOND STATORS

(71) Applicant: SEAGATE TECHNOLOGY LLC, Cupertino, CA (US)

(72) Inventors: PohLye Lim, Singapore (SG); PowMing Yap, Singapore (SG); ChunHong D. Jing, Singapore (SG); WeiRhen S. Hoon, Singapore (SG); Chris M. Woldemar, Santa Cruz, CA (US); Paco Gregor Flores, Felton, CA (US); Anthony Joseph Aiello, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 676 days.

(21) Appl. No.: 13/862,374

(22) Filed: Apr. 12, 2013

(65) Prior Publication Data

US 2014/0139948 A1    May 22, 2014

Related U.S. Application Data

(63) Continuation of application No. 12/510,263, filed on Jul. 28, 2009, now abandoned.

(51) Int. Cl.
*G11B 19/20* (2006.01)
*H02K 1/18* (2006.01)
(Continued)

(52) U.S. Cl.
CPC ......... *G11B 19/2036* (2013.01); *G11B 5/6005* (2013.01); *H02K 1/187* (2013.01); *H02K 7/085* (2013.01)

(58) Field of Classification Search
CPC  G11B 19/2036; G11B 5/6005; H02K 1/187; H02K 7/085
See application file for complete search history.

(56) References Cited

U.S. PATENT DOCUMENTS 6,097,120 A * 8/2000 Horng ................. H02K 5/1735
310/156.05
6,519,113 B1 * 2/2003 Boutaghou ........... F16C 17/107
310/67 R
(Continued)

FOREIGN PATENT DOCUMENTS

JP    2000-260111    9/2000
JP    2000311428    11/2000
(Continued)

OTHER PUBLICATIONS

Seagate. 2001 Seagate Technology LLC. Publication No. 100129212, Rev. B, Oct. 2001.*

*Primary Examiner* — Dang Le

(57) ABSTRACT

A fluid dynamic bearing motor and method are provided for use with various disc drive memory device products differently rated by operational rotational speed. The operational speeds are those speeds measured during reading and writing memory operations to the memory device. In an aspect, the present invention meets full operating requirements, including stiffness and power requirements, at multiple rated speeds for use with either standard or high-end performance disc drive products. Costs associated with a dedicated manufacturing line for high-end products are substantially reduced. A single manufacturing line can serve both standard and high-end disc drive memory device products. The present invention is especially useful in reducing costs of 2.5 inch notebook products that are typically marketed in two levels of performance, namely, 5400 RPM standard performance products and 7200 RPM high performance products.

7 Claims, 4 Drawing Sheets

| Common Motor for different speeds | Rated Speed | |
|---|---|---|
| | 5400 RPM | 7200 RPM |
| Stator winding turns | Same as 7200RPM design -> | Less |
| Size of fluid bearings | Optimized to best meet both speed requirements | |
| Fluid bearing gap | Optimized to best meet both speed requirements | |
| Oil | Low viscosity | |

(51) Int. Cl.
*G11B 5/60* (2006.01)
*H02K 7/08* (2006.01)

(56) References Cited

U.S. PATENT DOCUMENTS

| | | | | |
|---|---|---|---|---|
| 6,674,201 B2* | 1/2004 | Liu | | H02K 5/1677 310/67 R |
| 6,781,268 B2* | 8/2004 | Oku | | F16C 17/10 310/90 |
| 6,954,017 B2* | 10/2005 | Takahashi | | F16C 33/103 310/67 R |
| 7,224,552 B2* | 5/2007 | Herndon | | F16C 17/026 310/67 R |
| 7,586,660 B2* | 9/2009 | Itami | | G02B 26/121 310/180 |
| 7,876,008 B2* | 1/2011 | Yoshida | | H02K 3/522 310/216.115 |
| 7,994,669 B2* | 8/2011 | Lin | | F04D 29/646 310/67 R |
| 2003/0094869 A1* | 5/2003 | Ameen | | F16C 17/10 310/90 |
| 2006/0019840 A1* | 1/2006 | Kawahara | | C10M 169/04 508/280 |
| 2007/0013255 A1* | 1/2007 | Wakitani | | H02K 1/146 310/216.018 |
| 2007/0242911 A1 | 10/2007 | Nakagawa et al. | | |
| 2008/0088195 A1* | 4/2008 | Dooley | | H02K 1/2786 310/156.26 |

FOREIGN PATENT DOCUMENTS

| | | |
|---|---|---|
| JP | 2003119482 | 4/2003 |
| JP | 2004015893 | 1/2004 |
| JP | 2005-256968 A | 9/2005 |
| JP | 2005-290256 A | 10/2005 |

* cited by examiner

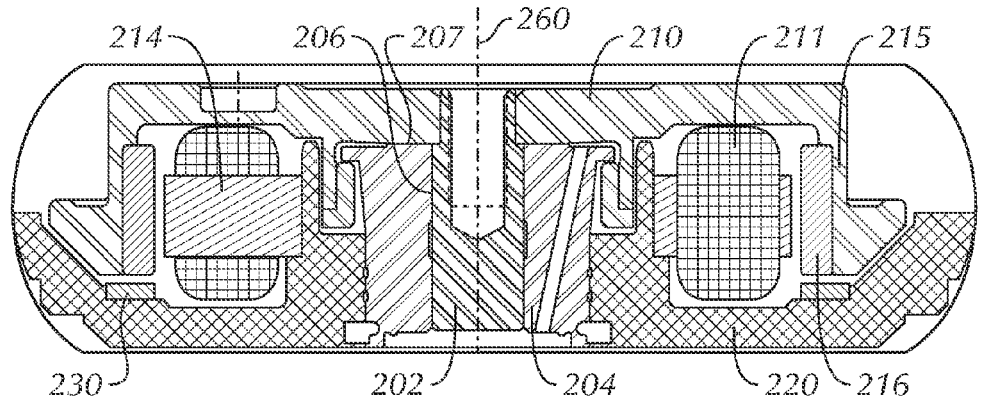

FIG. 2

| Separate Motor for different speeds (prior art) | Rated Speed | |
|---|---|---|
| | 5400 RPM | 7200 RPM |
| Stator winding turns | More | <-Less |
| Size of fluid bearings | Optimized for 5400RPM | <-Same or smaller |
| Fluid bearing gap | Optimized for 5400RPM | <-Larger |
| Oil | Either low or medium viscosity | |

FIG. 3A

| Common Motor for different speeds | Rated Speed | |
|---|---|---|
| | 5400 RPM | 7200 RPM |
| Stator winding turns | Same as 7200RPM design -> | Less |
| Size of fluid bearings | Optimized to best meet both speed requirements | |
| Fluid bearing gap | Optimized to best meet both speed requirements | |
| Oil | Low viscosity | |

FIG. 3B

STATIONARY AND ROTATABLE COMPONENTS OPERATIONAL WITH FIRST AND SECOND STATORS

FIELD

The invention relates generally to a disc drive memory device, and more particularly to a method and a fluid dynamic bearing motor for use with a range of different rotationally rated disc drive memory device products that operate at different rotational speeds during memory operations.

BACKGROUND

Disc drive memory systems are utilized in traditional stationary computing environments and also mobile environments including portable notebook computers digital cameras, digital video cameras, video game consoles and personal music players. These memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator.

Many disc drives utilize a spindle motor having a fluid dynamic bearing (FDB) situated between a shaft and sleeve to support the hub and the disc for rotation. The bearings permit rotational movement between the shaft and the sleeve, while precisely maintaining alignment of the spindle to the shaft. In a hydrodynamic bearing, a lubricating fluid is provided between a fixed member bearing surface and a rotating member bearing surface of the disc drive. These mobile devices are frequently subjected to various magnitudes of mechanical shock as a result of handling. As such, performance and design needs have intensified including improved resistance to shock events including axial and angular shock resistance, vibration response, and improved robustness. The read/write heads must be accurately aligned with the storage tracks on the disc to ensure the proper reading and writing of information. The stiffness of the fluid dynamic bearing is critical so that the rotating load is accurately and stably supported on the spindle without wobble or tilt. Moreover, a demand exists for increased storage capacity and smaller disc drives, which has led to the design of higher recording areal density such that the read/write heads are placed increasingly closer to the disc surface. Precise alignment of the heads with the storage tracks is needed to allow discs to be designed with greater track densities, thereby allowing smaller discs and/or increasing the storage capacity of the discs.

As a result of these intensified performance and design needs, and a need to meet operating requirements (including motor stiffness and power), motors for disc drive memory devices (i.e., 2.5 inch notebook motors) are typically marketed at two levels of performance, namely standard performance and high performance. The standard performance products commonly operate at about 5400 rotations per minute (RPM) rotational speed, while the higher performance products require a higher data access rate, which is typically achieved using a motor that operates at a rotational speed of about 7200 RPM. The high performance 7200 RPM products typically have higher manufacturing costs than the standard performance 5400 RPM products, and the high performance products typically sell at a lower volume, which results in a higher production cost due to manufacturing costs being spread over a smaller number of drives produced. Further, motors for desktop disc drive memory devices are also marketed at various levels of performance, namely low (i.e., 5400 RPM), medium (i.e., 7200 RPM) and high performance (i.e., 10,000 RPM), similarly resulting in higher production costs.

A different aspect of current notebook disc drive technology is the use of a low power mode to extend battery life in laptop computers. The low power mode, also known as idle mode, involves parking the read/write head on a ramp that is off a disc surface, and spinning the motor down to a lower speed while the drive is not being accessed. This power-saving "idle speed" is significantly lower than the "rated speed" (5400 or 7200 RPM) of the motor, but it is sufficiently high to maintain bearing clearances in the fluid dynamic bearing of the motor. The motor bearing viscous losses and the resulting run current are reduced by the square of the speed difference, while the bearing stiffness is reduced proportionally to the speed. Motor bearing stiffness requirements during the idle mode operation are not critical since the heads are parked and no read or write operations are occurring.

SUMMARY

An apparatus and method are described herein for providing a fluid dynamic bearing motor for use with an assortment of disc drive memory device products that operate at a different rotational speed during memory operations. The fluid dynamic bearing motor comprises a stationary component, a rotatable component, and a bearing system. The stationary component and the rotatable component have facing surfaces positioned for relative rotation. The bearing system is defined between the stationary component and the rotatable component; configured to reduce bearing stiffness sensitivity and power sensitivity to temperature change; configured to keep run current below a first predetermined limit when the rotatable component rotates at a first rotational speed; and configured to keep run current below a second predetermined limit without exceeding a voltage supply to the motor when the rotatable component rotates at a second rotational speed. The first rotational speed is less than the second rotational speed, and the first rotational speed and the second rotational speed are rotational speeds during at least one of a reading operation and a writing operation to the hard disc drive memory device. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2 is a sectional side view of a contemporary spindle motor used in a disc drive data storage system, in which an embodiment of the present invention is useful;

FIG. 3A is a representative table illustrating differences in component features and oils for two separate contemporary motor designs that operate at differently rated rotational speeds;

FIG. 3B is a representative table illustrating the present invention component features and oils that are optimized to meet performance requirements for two separate motors that operate at differently rated rotational speeds, in accordance with an embodiment of the present invention;

DETAILED DESCRIPTION

Figure 1:
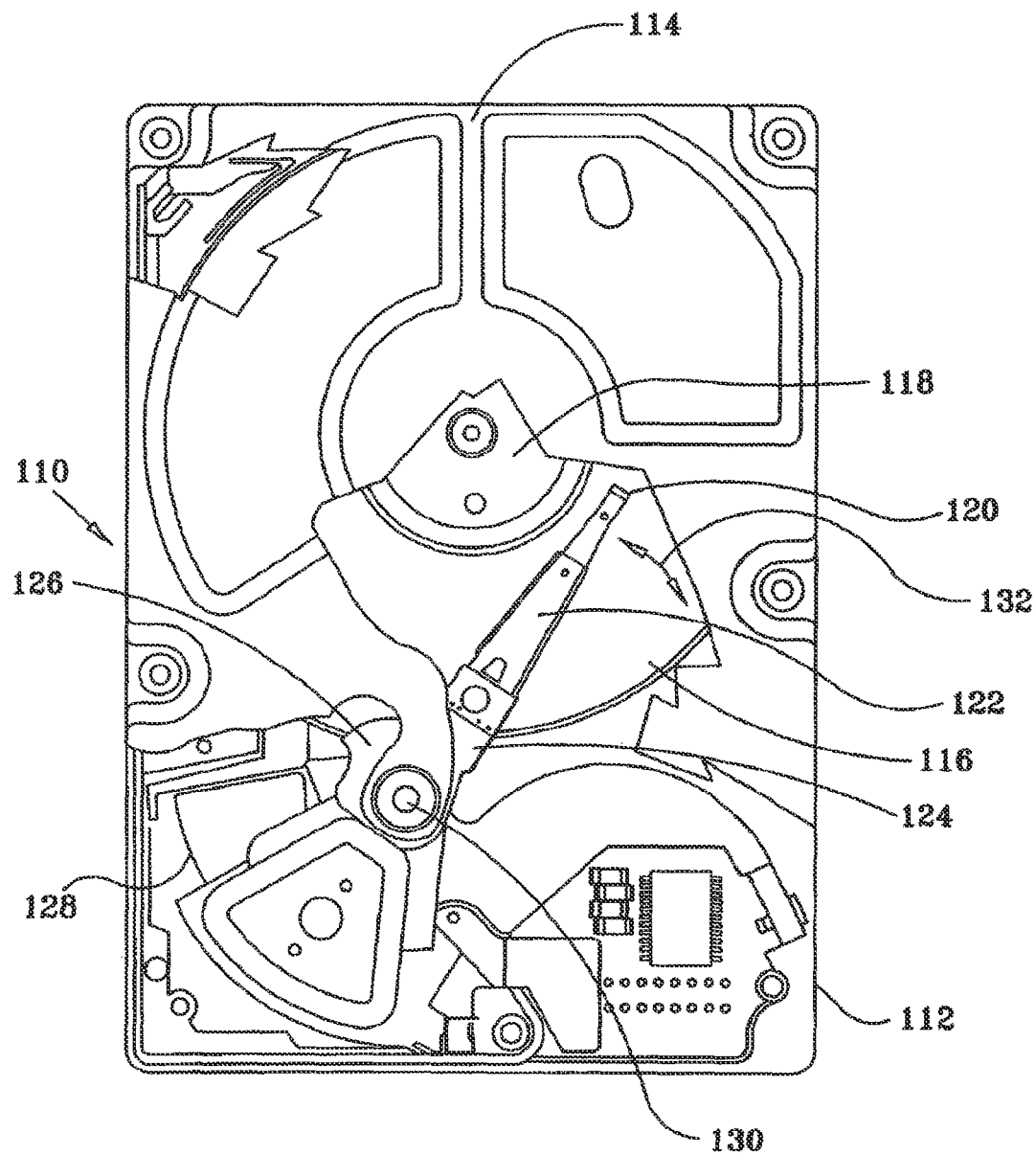
FIG. 1 is a top plan view of a disc drive data storage system in which the present invention is useful, in accordance with an embodiment of the present invention.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

In order to lower production costs of disc drive motors for high-end disc drive products that typically sell at lower volumes, it is desirable to use a single motor design for a range of different rotationally rated disc drive memory device products that operate at different rotational speeds (i.e., 5400 RPM and 7200 RPM speed products). Thus, overall manufacturing volume is increased, and the added costs associated with a dedicated manufacturing line for high-end 7200 RPM products can be avoided. However, a motor designed for 7200 RPM operation conventionally includes a motor torque constant (Kt) that is lower than a motor torque constant typically used with a 5400 RPM motor so that the driver electronics can spin the motor up to the rated speed at low temperatures (i.e., 0 degrees Celsius) without exceeding the source voltage. By employing a motor designed for 7200 RPM operation, and instead spinning it at 5400 RPM, a lower torque constant results in significantly higher running current, which is detrimental to battery life in a 5400 RPM notebook motor. Therefore, it is desirable to have a single motor design for both products (i.e., 5400 RPM and 7200 RPM products), which meets stiffness, run current and voltage performance requirements of current state of the art motors that employ separate designs for two different rated speed products.

An apparatus and method are described herein for a fluid dynamic bearing motor for use with an assortment of differently rated disc drive memory devices that operate at a different rotational speed during reading and writing memory operations. Reading and writing speeds are motor rotational speeds in which the memory device performs reading and writing operations, as contrasted to a non-memory operation idle speed in which for example, the read/write head is off a disc surface. In an embodiment, the present invention meets full operating requirements, including stiffness and power requirements, at multiple rated speeds for use with either standard or high-end performance disc drives. The present invention substantially reduces added costs associated with a dedicated manufacturing line for high-end products, thus allowing a single manufacturing line to serve both standard and high-end products. The present invention is especially useful in reducing costs of 2.5 inch notebook products that are typically marketed at two levels of performance, namely 5400 RPM standard performance products and 7200 RPM high performance products.

It will be apparent that features of the discussion and claims may be utilized with disc drive memory systems, low profile disc drive memory systems, spindle motors, brushless DC motors, ball bearing assemblies, various fluid dynamic bearing designs including hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 260 of shaft 202 shown in FIG. 2), and "radially" or "radial direction" refers to a direction perpendicular to the centerline axis 260, and passing through centerline axis 260. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures as described in this description and should not be construed as limiting.

Referring to the drawings wherein identical reference numerals denote the same elements throughout the various views, FIG. 1 illustrates a top plan view of a typical disc drive data storage system 110 in which the present invention is useful. Features of the discussion and claims are not limited to this particular design, which is shown only for purposes of the example. Disc drive 110 includes base plate 112 that is combined with cover 114 (shown with a broken-exposing view) forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for corotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Referring to FIG. 2, a sectional side view is illustrated of a contemporary spindle motor for use in a disc drive data storage system 110. This fluid dynamic bearing motor includes a rotatable component that is relatively rotatable about a stationary component, defining a journal bearing 206 therebetween. In this example, the rotatable components include shaft 202 and hub 210. In an alternative design, the shaft 202 is a stationary component, and the sleeve 204 is a rotatable component. Hub 210 includes a disc flange, which supports disc pack 116 (like that shown in FIG. 1) for rotation about axis 260 of shaft 202. Shaft 202 and hub 210 are integral with backiron 215. One or more magnets 216 are attached to a periphery of backiron 215. The magnets 216 interact with a lamination stack 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form two or more magnetic poles. The stator lamination stack 214 includes teeth about which stator windings 211 are wound. A circuit board applies and controls a voltage across the stator windings 211 to control rotational speed of the motor. The interaction of magnet 216 with the stator windings 211 creates a back-EMF voltage that must remain within a source voltage (as described below). The voltage generated by the motor (back-EMF voltage) plus the voltage measured across the motor and drive circuit resistors must not exceed the source voltage (i.e., the battery or power supply to the motor). The stationary components include sleeve 204 and stator windings 211, which are affixed to base 220. Bearing 206 is established between the sleeve 204 and the rotating shaft 202. A thrust bearing 207 is established between hub 210 and sleeve 204. Thrust bearing 207 provides an upward force on hub 210 to counterbalance the downward forces including the weight of hub 210, axial forces between magnet 216 and attractive plate 230, and axial forces between stator lamination stack 214 and magnet 216. In the case of a fluid dynamic bearing spindle motor, a fluid, such as lubricating oil fills the interfacial regions between shaft 202 and sleeve 204, and between hub 210 and sleeve 204, as well as between other stationary and rotatable components. While the present figure is described herein with a lubricating fluid, those skilled in the art will appreciate that useable fluids include a liquid, a gas, or a combination of a liquid and gas.

FIG. 3A is a representative table illustrating differences in component features and oils for two separate contemporary motor design products that operate at differently rated rotational speeds. In contemporary motor designs it is a typical approach to maximize commonality between motors used for 7200 RPM products and those used for 5400 RPM products in order to optimize component and assembly tooling costs. This results in different fluid dynamic bearing designs (i.e., bearing size and bearing gap) for the two products, since bearing stiffness increases with speed, and the amount of viscous loss in the bearing must be reduced to maintain a reasonable run current. Additionally, the motor torque constant is separately optimized for the specific rated speed of each product, which typically results in a different number of stator winding turns and a different winding resistance value for the different speed products.

As described, the contemporary 5400 RPM motor uses a greater number of stator winding turns as compared to the contemporary 7200 RPM motor. The 5400 RPM motor uses a predetermined optimized fluid bearing size, while the 7200 RPM motor uses the same or smaller bearing size as the 5400 RPM motor. The 5400 RPM motor uses a predetermined optimized fluid bearing gap, while the 7200 RPM motor uses a larger bearing gap as compared to the 5400 RPM motor. Both the 5400 RPM and 7200 RPM motors use either a low viscosity or medium viscosity oil for the fluid dynamic bearings. These design differences are used to independently optimize the stiffness performance and viscous losses for each different speed.

FIG. 3B is a representative table illustrating the present invention component features and oils that are optimized to meet performance requirements for two separate motors that operate at differently rated rotational speeds, in accordance with an embodiment of the present invention. In designing a motor for use in multiple products with different rated speeds, it is ideal to maximize the commonality, or have complete commonality for all components, for use with a range of different rotationally rated disc drive memory device products that operate at different rotational speeds during memory operations, in order to achieve the full potential cost benefits as previously described.

A comparison of FIG. 3A with FIG. 3B illustrates the differences between the present invention motor components that, are the same for the different speed products, and the contemporary designs that use different motor components for different speed products. As illustrated, the contemporary 7200 RPM motor typically uses less stator winding turns as compared to the contemporary 5400 RPM motor. The present invention 5400 RPM motor uses the same number of stator winding turns as the present invention 7200 RPM motor. Additionally, the present invention motor that operates at either 5400 RPM or 7200 RPM uses a fluid bearing size and a fluid bearing gap that is optimized to best meet both rotational speed requirements. Further, the present invention motor that operates at either 5400 RPM or 7200 RPM uses a low viscosity bearing fluid allowing tradeoffs between voltage margin at 0° C./7200 RPM and stiffness at 25° C./5400 RPM to be optimized to best meet both rotational speed requirements.

Greater or lesser cost benefits may be realized by varying degrees of commonality between two different rated speed products. When the present invention design is used along with other common disc drive systems, (i.e., heads, head stack assembly, voice-coil motor, discs, etc.) a firmware code change can be used to instruct the driver electronics to access a particular motor (i.e. a 5400 RPM standard drive or a 7200 RPM high-end drive), providing a manufacturing flexibility and cost benefit.

Figure 4:
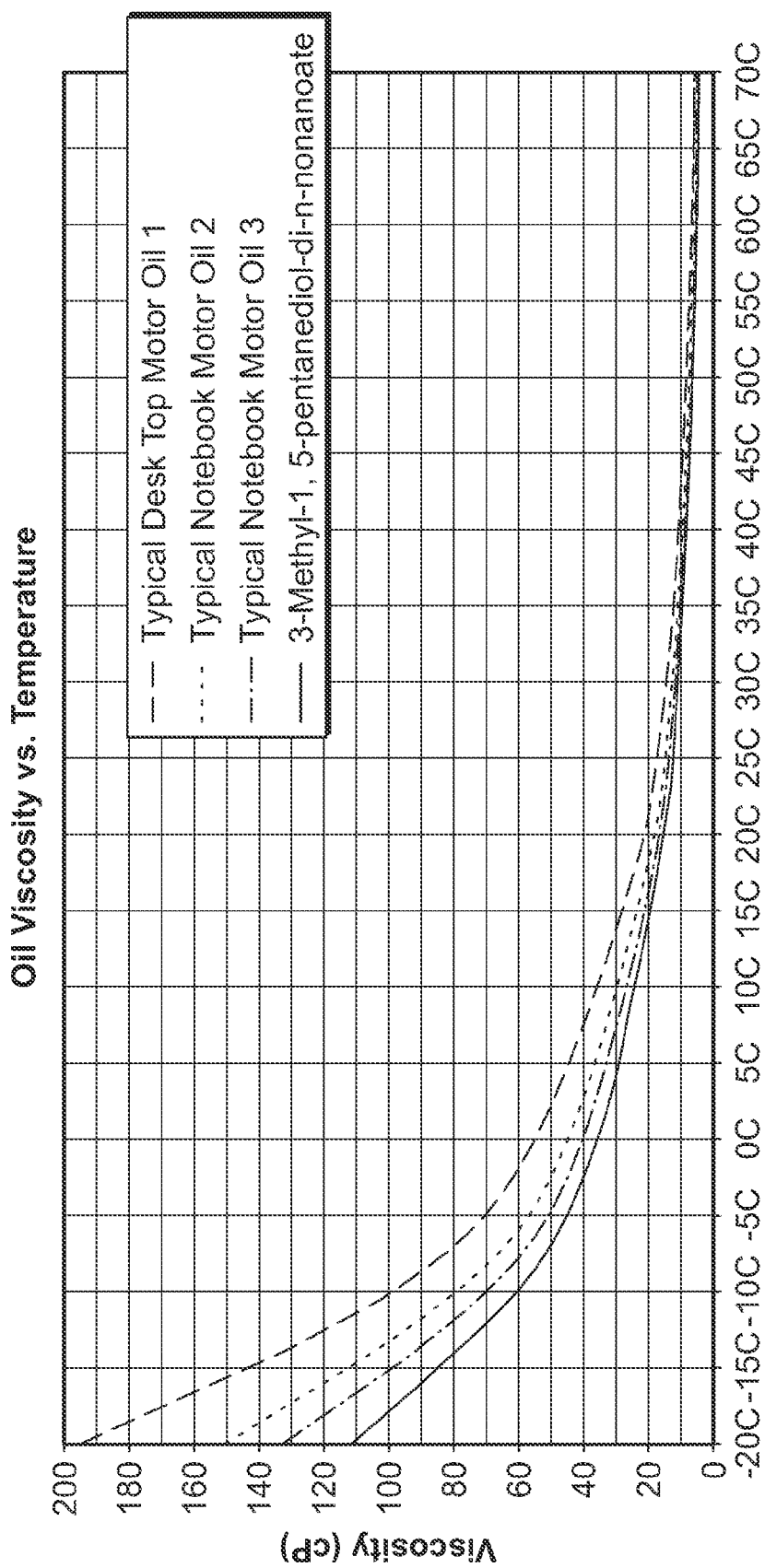
FIG. 4 is a representative table illustrating oil viscosity versus temperature behavior for three contemporary oils used with typical fluid dynamic bearing motor disc drive memory devices, and a low-viscosity oil 3-methyl-1,5-pentanediol-di-n-nonanoate as used in accordance with an embodiment of the present invention.

Turning now to FIG. 4, a table is shown illustrating oil viscosity versus oil temperature behavior for three oils used with contemporary fluid dynamic bearing motor disc drive memory devices, and a low-viscosity oil 3-methyl-1,5-pentanediol-di-n-nonanoate as used in accordance with an embodiment of the present invention.

The oils used with contemporary motor designs include a high-viscosity desktop disc drive oil and two medium-viscosity notebook disc drive oils. The contemporary desktop oil 1 has a higher viscosity than the present invention oils and is typically used in larger 3.5" desktop disc drives that carry a larger load and operate with a 12V power supply. The contemporary notebook oils 2 and 3 have a medium level of viscosity and less viscosity change between cold temperature (i.e. 0° C.) and ambient temperature (i.e. 25° C.), which makes them more suitable to notebook disc drive motors that support a lighter load with fewer and smaller discs, which operate on a 5V battery.

Oil characteristics including overall viscosity level (high, medium, low, etc.) and viscosity versus temperature "flatness" are utilized by the present invention. These characteristics are typically represented in industry by a parameter known as viscosity index (VI).

The viscosity index characterizes the flatness of oil viscosity versus temperature by a calculation related to the oil viscosity at two specific temperatures: 40° C. and 100° C. While this may be useful in many industries, in the case of hard disc drives and the present invention, the temperatures of interest also ranges from about −10° C. to 70° C. For optimizing the bearing and electromagnetic design of a disc drive motor, significant design considerations include the back-EMF voltage generated and run current at about −10° C. to 0° C., and the run current and bearing stiffness at about 25° C. to 35° C. For this reason, the viscosity index of an oil is less useful because it is related to a different temperature range. The relative flatness of an oil viscosity in a cold region does not always correlate to its relative flatness in a hot region. In an embodiment of the present invention, a bearing fluid is used having a viscosity index of less than 160.

As illustrated, the present invention motor design for multiple operating speeds utilizes a bearing oil that has both low viscosity and a relatively flatter viscosity vs. temperature curve as compared to the contemporary bearing oils. In an embodiment, the present invention utilizes 3-methyl-1, 5-pentanediol-di-n-nonanoate base oil, which is sufficiently flat for the present invention motor to meet performance requirements of contemporary separate motor designs. As shown in FIG. 4, the bearing fluid has a viscosity in the range of 60 centipoise (cP) to 4 cP when the fluid temperature is in the range of −10° C. to 70° C. Viscosity as described herein is described in terms of absolute viscosity (cP), in contrast to kinematic viscosity in centistokes (cSt). In an embodiment, a bearing fluid is utilized with a viscosity ranging from 70 cP to 4 cP when the bearing fluid temperature ranges from −10° C. to 70° C. Alternatively, a bearing fluid may be utilized having a viscosity ratio of less than 3.0, which is calculated by the fluid viscosity at 0° C. divided by the fluid viscosity at 25° C. In an embodiment, the oil 3-methyl-1,5-pentanediol-di-n-nonanoate base oil is used with a viscosity ratio of 2.79.

in another embodiment, the present invention utilizes an oil that is a specific base oil from the polyol ester group of oils, as described in U.S. Pat. No. 5,907,456, the disclosure of which is incorporated herein in its entirety by reference, which has a low viscosity and is sufficiently flat in the 0° C. to 25° C. temperature range for the present invention motor to meet performance requirements of contemporary separate motor designs. Specifically, the present invention oil enables the bearing stiffness and viscous loss trade-offs between 0° C. and 25° C., and between 5400 RPM and 7200 RPM, to be optimized such that run current and stiffness requirements of contemporary separate motors can be met by the present invention motor design for multiple speed products.

Other oils of low and relatively flat viscosity are also used by the present invention motor, including blended oils as described in U.S. Pat. No. 5,930,075, the disclosure of which is incorporated herein in its entirety by reference. In an embodiment, the bearing fluid is selected from the group consisting of diesters, polyol esters, polyalphaolefins, perfluoropolyethers and mineral hydrocarbons. Moreover, the 3-methyl-1,5-pentanediol-n-nonanoate base oil as shown can be formulated with a combination of additives including antioxidant, anti-wear, and conductivity-enhancing additives. In an embodiment, the present invention bearing fluid includes an anti-oxidant additive being effective to reduce oxidation of the lubricating fluid, an anti-wear additive being effective to reduce wear of the bearing facing surfaces, an anti-corrosion additive being effective to reduce corrosion of the facing surfaces, and a conductivity enhancing additive. In an embodiment, the bearing fluid anti-oxidant additive is selected from the group consisting of amines, phenols, and mixtures thereof. Bearing fluids and additives are further referred to in U.S. Pat. No. 5,907,456, the disclosure of which is incorporated herein in its entirety by reference.

In an embodiment, the present invention bearing fluid further includes at least one additive that reduces the rate of viscosity decrease of the bearing fluid as a function of increasing temperature. Bearing fluids additives are further referred to in U.S. Pat. No. 6,952,324, the disclosure of which is incorporated herein in its entirety by reference. In an embodiment, the bearing fluid additive is a polymer selected from the group consisting of polymethylacrylates, polyisobutene, olefin copolymer and styrene copolymer. Alternatively, the bearing fluid additive is a short chain alcohol ester, has a concentration of about 1-50% by volume of the lubricating fluid, or has a molecular weight within a range of about 1,000 Daltons to about 1,000,000 Daltons.

Figure 5:
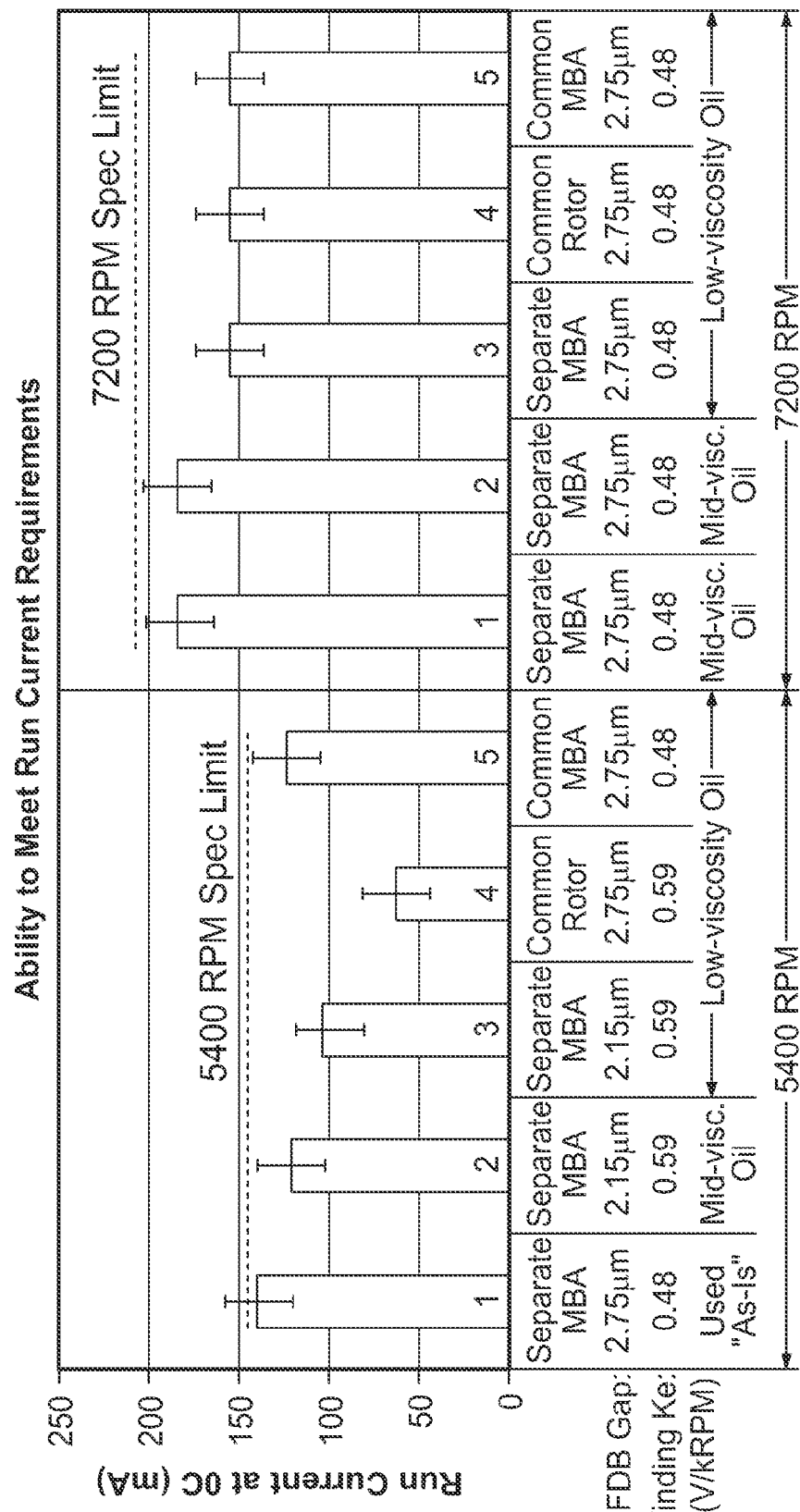
FIG. 5 is representative table illustrating run currents sampled at 0° C. for contemporary separate motor-base assembly products rated at 5400 RPM and 7200 RPM rotational speeds, in comparison to present invention embodiment common rotor products and common motor products at 5400 RPM and 7200 RPM rotational speeds.

The table illustrated in FIG. 5 represents run currents sampled at 0° C. for contemporary separate motor-base assembly (MBA) products rated at 5400 RPM and 7200 RPM (bars 1, 2, 3 for 5400 RPM motor, and bars 1, 2, 3 for 7200 RPM motor), in comparison to present invention embodiment common rotor products and common motor products at 5400 RPM and 7200 RPM (bars 4, 5 for 5400 RPM motor, and bars 4, 5 for 7200 RPM motor). By "common rotor" it is meant herein that one rotor design may be utilized with a range of different rotationally rated disc drive memory device products that operate at different rotational speeds during memory operations. By "common motor" it is meant herein that one motor design may be utilized with a range of different rotationally rated disc drive memory device products that operate at different rotational speeds during memory operations.

In an embodiment, the present invention provides a single fluid dynamic motor design that can be incorporated into either a disc drive memory device product with a rotational speed of, for example, 5400 RPM, or a disc drive memory device product with a rotational speed of 7200 RPM. Although the 5400 RPM and 7200 RPM motors are referred to throughout this description, in an embodiment, the present invention motor design can also be effectively incorporated into other rotational speed disc drive memory device products such as 3600 RPM, 4200 RPM, 5400 RPM, 5800 RPM, 5900 RPM, 7200 RPM, 10,000 RPM and 15,000 RPM, or other rotational speed disc drive memory device products including speeds between 3600 RPM and 15,000 RPM. Also, while the present invention is described with reference to a fluid dynamic bearing motor, other motors as described above may utilize embodiments of the present invention. These various rotational speeds are speeds of the disc drive memory device during reading or writing memory operations. The present invention substantially reduces added costs associated with a dedicated manufacturing line for high-end products, thus allowing a single manufacturing line to serve both standard and high-end products. The present invention is especially useful in reducing costs of 2.5 inch notebook products that are typically marketed in two levels of performance, namely 5400 RPM standard performance products and 7200 RPM high performance products. In an embodiment, the present invention meets full operating requirements of both products, including stiffness and power requirements, at multiple rated speeds for use with either standard or high-end performance disc drives.

As shown in FIG. 5, the present invention provides different levels of motor commonality for a motor design that can be used with either a 5400 RPM product or a 7200 RPM product, thus achieving varying levels of costs and benefits. The common rotor and common motor are designs of the present invention. The 5400 RPM motors are numbered as 1-5. The 5400 RPM motors 1-3 represent products with a separate motor-base assembly (MBA), the base being the disc drive base upon which the disc drive is mounted. "Separate" means that the 5400 RPM design is different as compared with the 7200 RPM design.

Motor 2 bar graph (5400 RPM) represents a conventional motor with a gap and winding Kt conventionally used for a 5400 RPM motor. Likewise, motor 2 bar graph (7200 RPM) represents a conventional motor with a gap and winding Kt conventionally used for a 7200 RPM motor. Motor 3 bar graph (5400 RPM) represents a motor with a gap and winding Kt conventionally used for a 5400 RPM motor, but with a low-viscosity oil. Likewise, motor 3 bar graph (7200 RPM) represents a motor with a gap and winding Kt conventionally used for a 7200 RPM motor, but with a low-viscosity oil.

Next, the 5400 RPM motor 4 represents a product with a common Rotor, the rotor being the rotational components, including the magnet. In the case of a "common Rotor," all rotating and beating-related parts of the motor are common (i.e., including a rotating sleeve and cap mounted to the sleeve enclosing the bearing), but the base and stator assembly are unique for each speed product. This allows a single manufacturing line for the rotor assembly (a complicated portion of a motor-base assembly) to serve two different product lines, resulting in a cost benefit. Next, the 5400 RPM motor 5 represents a product with a common Motor (common motor being the highest level of commonality). In the case of the "common motor," the stationary component is structured the same for the 5400 RPM rotational speed and the 7200 RPM rotational speed, the rotatable component is structured the same for the 5400 RPM rotational speed and the 7200 RPM rotational speed, and the bearing is structured the same for the 5400 RPM rotational speed and the 7200 RPM rotational speed.

Similarly, the 7200 RPM motors are numbered as 1-5. The 7200 RPM motors 1-3 represent products with a separate motor-base assembly (MBA), the base being the disc drive base upon which the disc drive is mounted. "Separate" means that the 7200 RPM design is different as compared with the 5400 RPM design. Next, the 7200 RPM motor 4 represents a product with a common Rotor, the rotor being the rotational components, including the magnet. As described above, in the case of a "common Rotor," all rotating and bearing-related parts of the motor are common, but the base and stator assembly are unique for each speed product. This allows a single manufacturing line for the rotor assembly (a complicated portion of a motor-base assembly) to serve two different product lines, resulting in a cost benefit. Next, the 7200 RPM motor 5 represents a product with a common Motor (common motor being the highest level of commonality). In the case of the "common motor," the stationary component is structured the same for the 5400 RPM rotational speed and the 7200 RPM rotational speed, the rotatable component is structured the same for the 5400 RPM rotational speed and the 7200 RPM rotational speed, and the bearing is structured the same for the 5400 RPM rotational speed and the 7200 RPM rotational speed.

The bar graphs of motors 1 and 2 (prior art) illustrate some advantages of the present invention motors 4 and 5, Motor 2 bar graphs for the 5400 RPM and 7200 RPM motors (prior art) are motors used for their separate rotational speed products. The bar graph for motor 1 (7200 RPM) has the same run current as motor 2 (7200 RPM), since these motors 1 and 2 (7200 RPM) are the same. However, when motor 2 (7200 RPM) is used as-is for the 5400 RPM motor, motor bar 1 (5400 RPM) results in a run current that can exceed the run current specification limit (due to the Kt being optimized for the 7200 RPM). Further, FIG. 5 illustrates the lower run currents for the present invention motors 4 and 5 as compared to the conventional motors 1 and 2.

The present invention fluid dynamic bearing motor design can serve more than one operational rotational speed while meeting operational requirements of a conventional separate motor that is designed for a single operational rotational speed. Optimization of the fluid dynamic bearing is performed to determine the desired trade-off between power and stiffness. Design considerations include minimized run current resulting from minimization of bearing viscous losses and maximization of the motor torque constant. In an embodiment, with regard to a fluid dynamic bearing motor that meets operational requirements for a 5400 RPM motor and a 7200 RPM motor, the present invention employs the following design methods. Bearing sensitivity to temperature change is reduced.

At ambient temperature (i.e., 25° C.) bearing gap and bearing size are structured to meet a required operational stiffness under operating vibration conditions for the 5400 RPM motor, since stiffness is lower with lower rotational speed. The bearing stiffness is optimized to minimize the motor response to vibration of the base, caused by a shock event or other vibration causing source. The response motion causes the read/write head to shift, potentially "off track." If the motion is large, the head will be unable to follow the disc data track and could fail at reading or writing to the disc. The sensitivity of this "off track" motion is increased at high frequency since the servo system that moves the head can more easily respond to low frequency vibrations. Thus, bearing stiffness can be tuned for a number of different frequency zones of concern (i.e., around structural resonances). In an example, bearing stiffness is tuned at bearing oil temperatures of about 25° C. to about 70° C. The bearing gap is the radial gap of the journal between the two relatively rotatable facing surfaces. Bearing gaps typically range from about 1.5 to 6 µm, and also about 2.1 to 3.5 µm. Bearing size is dependent on the shaft diameter (i.e., 1.8 mm to 5 mm) and the axial height of the motor. The disc drive height of 5 mm to 25 mm can have a wide range of bearing lengths depending on a disc pack size. Notebook motors typically have a shaft diameter of about 2.5 to 3.0 mm and a bearing length of about 1.5 to 3 mm (sum of upper and lower journals). A thrust bearing size can also affect stiffness.

Bearing stiffness typically decreases as temperature increases, while bearing stiffness typically increases as temperature decreases. At lower temperatures, the bearing oil viscosity is higher and the bearing is stiffer. Therefore, a bearing fluid is selected that has a flat viscosity versus temperature behavior ("flat oil"), such as the present invention oil described in FIG. 4. This results in a smaller increase of viscous losses between ambient temperatures (about 25° C.) and cold conditions (typically about 0° C.). In an embodiment, headroom voltage is calculated at 0° C. At this temperature, the 3-methyl-1,5-pentanediol-di-n-nonanoate bearing oil shows lowest viscosity, providing an improved motor design, considering factors such as Kt, voltage, and run current.

Alternatively, or in addition to utilizing a "flat oil," the present invention compensates for bearing temperature change with thermally compensating materials that face the bearing. The thermally compensating materials are provided by materials having different coefficients of thermal expansion. The bearing gap situated between the materials increases as the bearing temperature decreases. Example materials of one surface (i.e., shaft) include aluminum, brass, bronze, plastic, copper-based sintered metals, and polyimide with graphite filler, and example materials of the facing surface (i.e., sleeve) include stainless steel, 400 series stainless steel, iron-based sintered metals, ceramic, carbide, and nitride.

The viscous torque losses in relation to temperature are represented by the bearing system drag profile. The bearing drag profile can be affected by various means, including those described herein including a "flat oil" and thermally compensating material components with different coefficients of thermal expansion. Power is determined when viscous torque losses are multiplied by speed. The drag is a rotational torque, and can be a result of factors including bearing fluid viscosity, the rotational speed of the drive, bearing diameter, etc. Both torque and power are directly proportional to fluid viscosity.

Once the bearing dimensions and viscous losses are optimized, the stator winding for 7200 RPM operation is designed to ensure a voltage margin is adequate to allow the motor to rotate at the higher rated 7200 RPM rotational speed (vs. 5400 RPM). Voltage margin is also known in industries as "headroom voltage." The voltage generated by the motor (back-EMF voltage) plus the voltage measured across the motor and drive circuit resistors must not exceed the source voltage (i.e., the battery or power supply to the motor). This can be expressed by the equation Vsource>Vemf+I multiplied by R. "Vsource" represents the source voltage, "Vemf" represents the back-EMF voltage, "I" represents the run current (amps), and "R" represents the motor and drive circuit resistance (ohms). Run current is current supplied by the driver electronics to the winding coil, in order to rotate the motor. Run currents are minimized to reduce power loss, and are typically greater in the 7200 RPM motor as compared with the 5400 RPM motor. In an example, run current is minimized at bearing oil temperatures of about −10° C. to about 0° C. and about 25° C. to about 35° C. Disc drive source voltages are typically 3.3V for thin disc drives, 5V for notebook drives or 12V for 3.5 inch disc drives, although any source voltage is possible. In an example, the back-EMF voltage is adjusted for bearing oil temperatures of about −10° C. to about 0° C.

The motor torque constant (Kt) for the 7200 RPM motor ranges from about 0.45 oz-in/A to 0.75 oz-in/A. The motor torque constant (Kt) for the 5400 RPM motor ranges higher from about 0.7 oz-in/A to 1.0 oz-in/A. Kt can also be expressed as motor voltage constant (Ke), depending on units. In an embodiment (i.e., common rotor design), the Kt is maximized to reduce run current. Kt may be maximized for other reasons, such as a higher torque produced by the motor, which results in a faster spin-up of the motor, shorter time-to-ready, quicker electrical breaking to spin down, or more current generated on spin-down for use in parking the heads (such as in the case where the disc drive electrical supply is suddenly interrupted). There are numerous methods to adjust the Kt, including varying the magnet material, magnetization strength, number of stator laminations, stator diameter, and number of stator winding turns.

Once the specification requirements are met for the 7200 RPM motor, the common motor utilizes the above-described methods to next meet the specification requirements (i.e., run current limit) for the 5400 RPM motor. In an embodiment, the headroom voltage margin is minimized at 7200 RPM for cold starting conditions (typically 0° C.). Therefore the Kt can be maximized, which lowers the run current at 5400 RPM operation. In the case of the common rotor, the 5400 RPM fluid dynamic bearing motor has a maximized torque constant that is equal to or less than a maximum torque constant for a motor that operates at the 5400 RPM rotational speed. In the case of the common motor, the 5400 RPM fluid dynamic bearing motor has a maximized torque constant that is equal to or less than a maximum torque constant for a motor that operates at the 7200 RPM rotational speed. With the ability to increase the motor Kt and the added viscous loss margin related to desensitizing the bearing to temperature change, the resulting motor run current is lowered for operational temperatures and a range disc drive memory device products that operate at different rotational speeds during memory operations.

Modifications and variations may be made to the disclosed embodiments while remaining within the spirit and scope of the invention. The implementations described above and other implementations are within the scope of the following claims.

The invention claimed is:

1. An apparatus comprising:
a stationary component, wherein said stationary component includes a first stator or a second stator, the first stator including a greater number of windings than the second stator;
a rotatable component including a backiron, wherein
said stationary component and said rotatable component are positioned for relative rotation, and
said stationary component and said rotatable component are configured to operate with either stator; and
a fluid dynamic bearing defined by said stationary component and said rotatable component, wherein either stator is between said fluid dynamic bearing and said backiron.

2. The apparatus of claim 1, wherein the fluid dynamic bearing includes a fluid that is a 3-methyl-1,5-pentanediol-di-n-nonanoate.

3. The apparatus of claim 1, wherein a configuration of said fluid dynamic bearing is operational with said first stator and said second stator.

4. The apparatus of claim 1, wherein said fluid dynamic bearing includes a fluid with a fluid viscous index that maintains a bearing stiffness in a range of temperatures that is operable with said first stator and said second stator.

5. The apparatus of claim 4, wherein said fluid viscous index is less than 160.

6. The apparatus of claim 4, wherein said range of temperatures is between 0° C. to 25° C.

7. The apparatus of claim 1,
wherein said first stator is configured to cause said rotatable component to rotate at a range of 3600 rotations per minute (RPM) to 5800 RPM; and
wherein said second stator is configured to cause said rotatable component to rotate at a range of 7200 RPM to 15,000 RPM.

* * * * *